US012654872B2

(12) United States Patent
Janakiraman et al.

(10) Patent No.: US 12,654,872 B2
(45) Date of Patent: Jun. 16, 2026

(54) SYSTEMS AND METHODS OF INTEGRATED APPLICATION FRAMEWORK FOR CONNECTED AIRCRAFT USING AVIONICS SYSTEMS

(71) Applicant: Honeywell International Inc., Charlotte, NC (US)

(72) Inventors: Kirupakar Janakiraman, Madurai (IN); Kalimulla Khan, Bangalore (IN); Phillip Toews, Phoenix, AZ (US); Ramkumar Rajendran, Madurai (IN); Manish Goswami, Bangalore (IN); Srihari Jayathirtha, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 244 days.

(21) Appl. No.: 17/931,099

(22) Filed: Sep. 9, 2022

(65) Prior Publication Data

US 2023/0365270 A1     Nov. 16, 2023

(30) Foreign Application Priority Data

May 10, 2022    (IN) .............................. 202211026941

(51) Int. Cl.
*B64D 45/00*     (2006.01)
*B64D 43/00*     (2006.01)
(Continued)

(52) U.S. Cl.
CPC ............. *B64D 45/00* (2013.01); *B64D 43/00* (2013.01); *G06F 3/14* (2013.01); *G06F 8/76* (2013.01); *B64D 2045/0075* (2013.01)

(58) Field of Classification Search
None
See application file for complete search history.

(56) References Cited

U.S. PATENT DOCUMENTS 6,735,438 B1 * 5/2004 Sabatino ................ H01Q 1/246
                                     343/705
8,701,953 B2 * 4/2014 Bopp ..................... B64D 45/00
                                     224/547

(Continued)

FOREIGN PATENT DOCUMENTS

CN        112068808       12/2020

OTHER PUBLICATIONS

Jeppesen, "Aviator from Jeppesen Integrates EFB Apps in Single Framework," 2 pages, (Feb. 14, 2017). [Retrieved from the Internet Jan. 23, 2025: URL: <https://news.jeppesen.com/news-room/aviator-jeppesen-integrates-efb-apps-single-framework/>].

(Continued)

*Primary Examiner* — Redhwan K Mawari
*Assistant Examiner* — Kai Wang
(74) *Attorney, Agent, or Firm* — ALSTON & BIRD LLP

(57) ABSTRACT

Disclosed are methods, systems, and one or more computer-readable mediums for providing, by an integrated flight deck (IFD) networked computing system, data acquisition for generating a plurality of inflight operation insights, the IFD networked computing system comprising: a presentation platform, a plurality of framework components, a software development kit (SDK) framework, and one or more user interface libraries configured to develop a plurality of applications from the presentation platform and add one or more additional SDKs and/or libraries to the presentation platform; aggregating, by an orchestrator of the SDK framework, a plurality of data sources to fuse data from the plurality of data sources and create a data packet comprising real-time flight data; generating, the plurality of inflight operation insights by analyzing a plurality of key performance indicators of the created data packet; and assessing a (Continued)

flight parameter based on the generated inflight operation insights.

20 Claims, 9 Drawing Sheets

(51) Int. Cl.
G06F 3/14 (2006.01)
G06F 8/76 (2018.01)

(56) References Cited

U.S. PATENT DOCUMENTS

| | | | | |
|---|---|---|---|---|
| 9,260,182 | B2 | 2/2016 | Hathaway | |
| 10,007,513 | B2 * | 6/2018 | Malladi | G06F 8/70 |
| 10,049,508 | B2 | 8/2018 | Jensen et al. | |
| 10,053,228 | B2 * | 8/2018 | Kahn | G07C 5/0841 |
| 11,461,191 | B2 * | 10/2022 | Denneman | G06F 11/1469 |
| 12,327,478 | B2 * | 6/2025 | Janakiraman | G06Q 30/04 |
| 12,347,328 | B2 * | 7/2025 | Khan | G08G 5/26 |
| 12,394,320 | B2 * | 8/2025 | Janakiraman | G08G 5/57 |
| 12,461,518 | B2 * | 11/2025 | Emery | G05B 23/027 |
| 2005/0091576 | A1 * | 4/2005 | Relyea | G06F 9/451 |
| | | | | 715/210 |
| 2007/0055416 | A1 * | 3/2007 | Allen | G08G 5/26 |
| | | | | 701/3 |
| 2010/0146085 | A1 * | 6/2010 | Van Wie | G06F 3/165 |
| | | | | 709/224 |
| 2013/0190080 | A1 * | 7/2013 | Bibbey | G07F 17/3227 |
| | | | | 463/29 |
| 2014/0222254 | A1 * | 8/2014 | Ribich | F16M 13/00 |
| | | | | 361/679.56 |
| 2020/0133945 | A1 * | 4/2020 | Friedt | G06F 16/2471 |
| 2020/0320885 | A1 * | 10/2020 | Subramaniyan | G08G 5/34 |
| 2020/0327371 | A1 * | 10/2020 | Sharma | G06N 5/04 |
| 2021/0014113 | A1 * | 1/2021 | Guim Bernat | H04L 41/0273 |
| 2021/0117246 | A1 * | 4/2021 | Lal | G06F 9/3814 |
| 2022/0026896 | A1 * | 1/2022 | Leitch | G05B 23/0235 |
| 2023/0282036 | A1 * | 9/2023 | Simoudis | G06N 3/08 |
| 2023/0365270 | A1 * | 11/2023 | Janakiraman | G06F 9/44505 |
| 2024/0370251 | A1 * | 11/2024 | Malladi | H04L 67/12 |

OTHER PUBLICATIONS

Keith Button, "A.I. in the cockpit," 6 pages, (Jan. 2019). [Retrieved from the Internet Jan. 27, 2025: URL: <https://aerospaceamerica.aiaa.org/features/a-i-in-the-cockpit/>].

Mark Robins, "Electronic Flight Bag (EFB) Developments Increasing Airline Efficiencies and Streamlining Pilot Workflows," 6 pages, (Jan. 30, 2022). [Retrieved from the Internet Jan. 23, 2025: URL: <https://aerospacetechreview.com/electronic-flight-bag-efb-developments-increasing-airline-efficiencies-and-streamlining-pilot-workflows/>].

* cited by examiner

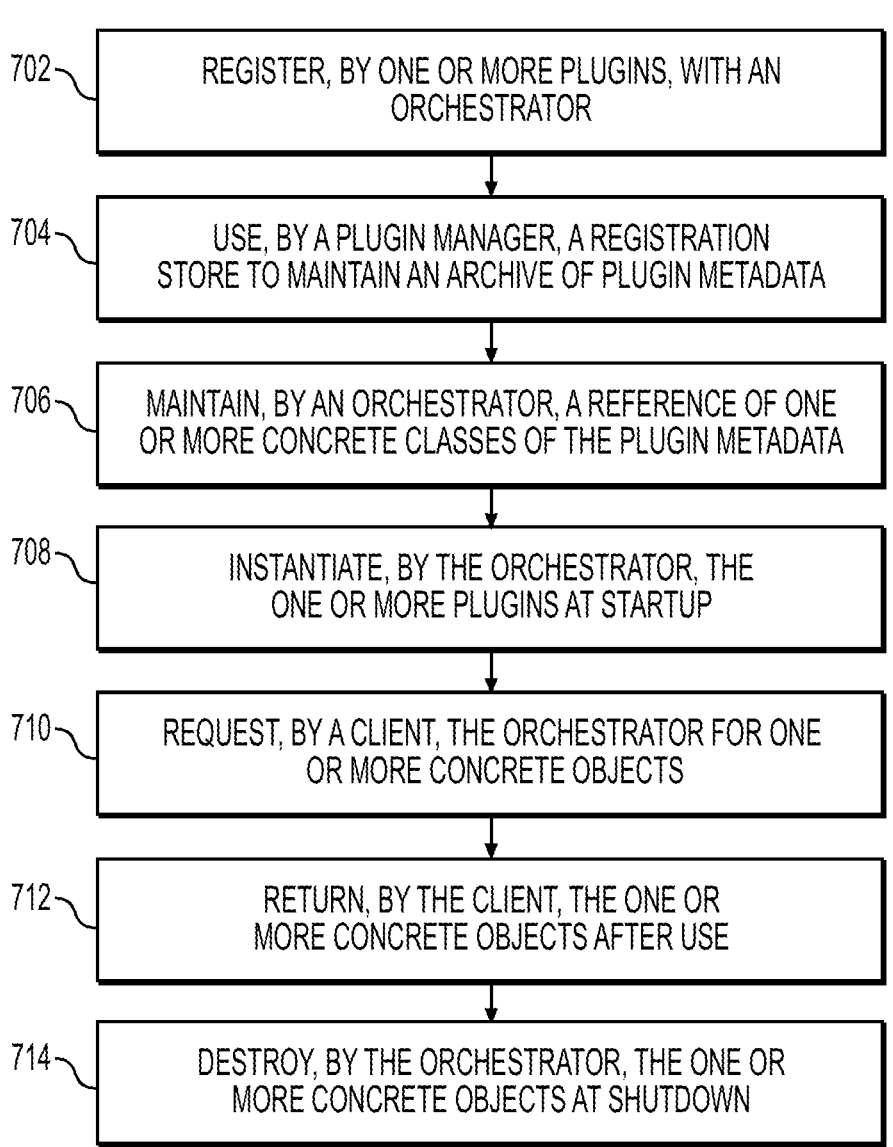

700

702 — REGISTER, BY ONE OR MORE PLUGINS, WITH AN ORCHESTRATOR

704 — USE, BY A PLUGIN MANAGER, A REGISTRATION STORE TO MAINTAIN AN ARCHIVE OF PLUGIN METADATA

706 — MAINTAIN, BY AN ORCHESTRATOR, A REFERENCE OF ONE OR MORE CONCRETE CLASSES OF THE PLUGIN METADATA

708 — INSTANTIATE, BY THE ORCHESTRATOR, THE ONE OR MORE PLUGINS AT STARTUP

710 — REQUEST, BY A CLIENT, THE ORCHESTRATOR FOR ONE OR MORE CONCRETE OBJECTS

712 — RETURN, BY THE CLIENT, THE ONE OR MORE CONCRETE OBJECTS AFTER USE

714 — DESTROY, BY THE ORCHESTRATOR, THE ONE OR MORE CONCRETE OBJECTS AT SHUTDOWN

*FIG. 7*

SYSTEMS AND METHODS OF INTEGRATED APPLICATION FRAMEWORK FOR CONNECTED AIRCRAFT USING AVIONICS SYSTEMS

RELATED APPLICATION

This application claims the benefit of priority to Indian Provisional Application No. 202211026941, filed May 10, 2022, which is incorporated herein by reference in its entirety.

TECHNICAL FIELD

Various embodiments of the present disclosure relate to networked connected computing environments for avionics.

BACKGROUND

Application developers creating products targeted to interface with avionics systems have a multidimensional problem to solve. They must understand security requirements. They must also understand the complexity of interfacing with avionics devices and cloud-based services. Developers must also understand subscription and licensing details. They must also gain access to all the required software development kits (SDKs), and properly integrate them into their application.

The present disclosure is directed to overcoming one or more of these above-referenced challenges.

SUMMARY OF THE DISCLOSURE

According to certain aspects of the disclosure, systems and methods are disclosed for providing a guided development platform that reduces complexity for the user, and aggregates the avionics-provided data to allow multisystem applications to easily communicate with an entire avionics suite. The guided development platform also enables communication with avionics in a format that enables developers to quickly develop mobile avionics applications without becoming domain experts in all the various avionics systems or cloud-based services with which their application will interface.

In some aspects, methods, systems, and one or more computer-readable mediums are provided for using an electronic flight bag (EFB) application framework with an aircraft. The method can include providing, by an integrated flight deck (IFD) networked computing system, data acquisition for generating a plurality of inflight operation insights, the IFD networked computing system comprising: a presentation platform, a plurality of framework components, a software development kit (SDK) framework, and one or more user interface libraries configured to develop a plurality of applications from the presentation platform and add one or more additional SDKs and/or libraries to the presentation platform; aggregating, by an orchestrator of the SDK framework, a plurality of data sources to fuse data from the plurality of data sources and create a data packet comprising real-time flight data; generating, the plurality of inflight operation insights by analyzing a plurality of key performance indicators of the created data packet; assessing a flight parameter based on the generated inflight operation insights; and presenting an electronic display regarding the flight parameter to one or more users, the electronic display comprising an electronic display of one or more actions available for changing a flight operation.

In some aspects, the method may include evaluating, by the IFD networked computing system, the plurality of inflight operation insights against current atmospheric conditions and real-time flight mission information to generate a plurality of flight mission insights, the flight operation insights including fuel efficiency insights and/or flight efficiency insights.

In some aspects, the orchestrator is a common object layer, wherein the step of a includes receiving, by the common object layer, objects from low-level platform components; and using the received objects to receive data from the plurality of data sources, including get and send files, get, and send objects, sign up for periodic data, and/or sign up for event data.

In some aspects, the orchestrator is a single point of source where a client and/or a feature module can access components and services of the common object layer.

In some aspects, the method can include holding, by an object factory in communication with the orchestrator, objects from the low-level platform components in an object pool; and using, by the object factory, a plugin manager to register and/or deregister the low level platform components.

In some aspects, the method can include connecting the plurality of framework components via a common orchestrator.

In some aspects, the method can include registering each of the plurality of data sources with the orchestrator and then exposing a common API to the orchestrator.

In some aspects, the plurality of framework components includes an object factory, and a plugin manager in communication with the object factory.

In some aspects, the method can include generating, by a flight level advisory system of the IFD networked computing system, one or more cost-efficient flight levels based on historical flight data.

In some aspects, the method can include presenting the plurality of inflight operation insights on a user interface.

In some aspects, the method can include generating, by the IFD networked computing system, one or more real-time maintenance alerts by analyzing real-time avionics data and detecting one or more fault conditions or event conditions.

In some aspects, the method can include providing communication connectivity, via an avionics data processing service (ADPS), between the aircraft, one or more external EFB devices and/or a cloud based computing system, a processor of the aircraft being configured to control one or more on-board avionics control functions using the ADPS to render accessible a connected cockpit computing system.

In some aspects, the method can include analyzing, by the IFD networked computing system, avionics data to detect one or more anomalies related to a flight operation; and upon detecting the one or more anomalies, then generating, by the IFD networked computing system, one or more alerts to be presented on a user interface. In some aspects, the method can include instructing to take one or more corrective actions to prevent one or more operational disruptions.

In some aspects, the method can include determining a prediction, using a machine learning prediction model, for one or more fault conditions, event conditions, and/or anomalies of inflight operations, the machine learning prediction model having been generated by processing avionics data and the real-time flight data; and causing the aircraft, based on the prediction, to take one or more corrective actions to prevent one or more operational disruptions.

In some aspects, an electronic flight bag (EFB) application framework system of an aircraft is disclosed. The system can include at least one memory storing instructions and at least one processor executing the instructions to perform a process including using real-time flight data to generate end-to-end real-time data analytics for inflight features around inflight operation insights and mission management, the real-time flight data including a plurality of onboard avionics subsystems; using real-time flight data to generate an avionics common object model of the aircraft; fusing the avionics common object model with data corresponding to aerospace safety services, fuel efficiency service, ground service, pilot workflow automation and connected maintenance service for that aircraft; integrating one or more avionics subsystems into the avionics common object model by using automated extensions and defining a domain model based upon the avionics common object model and making the domain model available for one or more applications via onboard application programming interfaces (APIs); using the avionics common object model to provide a bi-directional flow of communication between the one or more avionics subsystems and applications hosted on one or more external EFB devices; and transmitting one or more alert messages from one or more applications hosted on one or more external EFB devices to a user based on the inflight operation insights and/or a flight status.

In some aspects, the real-time flight data includes in-flight mode data. In some aspects, the real-time flight data includes one or more of data of the flight management system (FMS), Terrain Awareness and Alerting system, one or more engines, auxiliary power units, one or more wheels, and/or one or more brakes.

In some aspects, the applications hosted on the one or more external EFB devices are directed to fuel efficiency, flight safety, aircraft maintenance, and/or pilot workflow automation.

In some aspects, the one or more alert messages include pilot triggers, pilot alerts, and/or advisories. In some aspects, the one or more alert messages include weather hazard avoidance, flight efficiency and safety.

A system may include at least one memory storing instructions; and at least one processor executing the instructions to perform any of the herein disclosed methods and/or processes.

A non-transitory computer-readable medium storing instructions that, when executed by a processor, cause the processor to perform any of the herein disclosed methods and/or processes.

In some aspects, the system includes all content within a single application to enable synergies across multiple applications and thus make them more usable.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts an exemplary diagram of a data flow of the orchestrator, according to one or more embodiments.

DETAILED DESCRIPTION OF EMBODIMENTS

Figure 1:
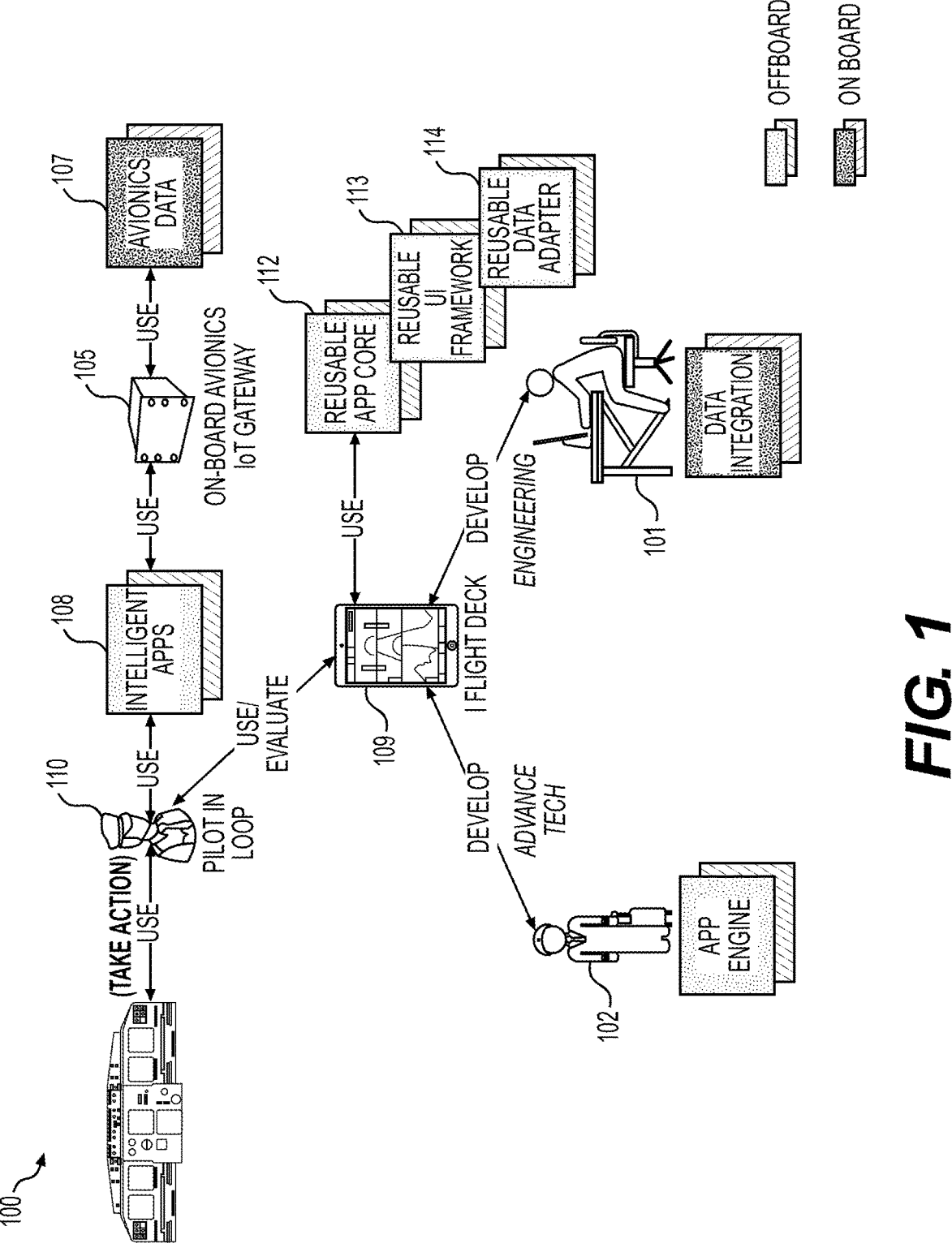
FIG. 1 depicts an exemplary diagram of a data flow, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate to systems and methods of an analytics framework to provide an intelligent software development kit (SDK) which will help users generate inferences from onboard avionics systems and other systems near or in communication with the data source, and aid in decision making (e.g., rule based and/or autonomous) using an end-to-end reference architecture for achieving various benefits around increased efficiency and safety in real-time Some limitations in existing cloud-based intelligence for onboard avionics applications may include: an aircraft produces a large amount of data for a long-haul flight (e.g., 45 TB of data); in a business and general aviation (BGA) segment, an aircraft will have less than 40% of continued internet up time between an end to end flight; the level B or C onboard avionics systems have deterministic computer power for advanced use cases; artificial intelligence (AI) applications in avionics are currently limited for post flight analytics over limited domain use cases around flight efficiency, maintenance, and safety; and, storage may be limited and expensive on onboard systems.

The above limitations may result in the following problems and/or disadvantages: costs involved in the lift and shift/storage of Aerospace Internet of Things (AIoT) onboard edge data to the cloud; taking real-time decisions closer to the data source onboard avionics systems for increased efficiency and safety; making better decisions when the aircraft is not connected to the cloud; facing the advent of AIoT and the proliferation of massive amounts of data through onboard avionics connected devices; availability of predictive and real-time intelligence for onboard avionics devices; adoption of edge analytics increases scalability and caters for a fault tolerant system with two tiers of processing; and seamless integration between intelligent cloud and intelligent edge.

One or more embodiments of the present disclosure provide systems and methods of a novel analytics framework to provide an intelligent software development kit which will enable users to generate flight mission insights and/or inferences onboard the avionics systems near and/or in communication with the data source and aid in decision making (rule-based or autonomous) using an end-to-end reference architecture for achieving various benefits around increased efficiency and safety in real-time.

One or more embodiments of the present disclosure may provide the following benefits and/or advantages: process device-generated data in real-time (e.g., filter, aggregate, rules, transformation, analyze, predict, detect anomalies); limit data sent to the cloud (e.g., aggregated data, anomalies); scalable solution that runs on different target platforms; improve performance requirements (e.g., data ingress, response time); and improve quality of service (e.g., manageability, upgradability, security).

Inflight real-time analytics, if done through a cloud infrastructure, call for an expensive SATCOM link where the cost for pushing the data through the pipe is immense. As a result, analytics should be computed on the edge, as close to the data source as possible, with the size of the analytics being dependent on the computing, storage, and memory limitations. With several smart and very highly capable devices in the form of gateways and edge nodes, it forms for a great use case. Also, the cost of cloud computing can be reduced.

Being deployed as a framework has advantages of having the flexibility to be hosted on third party devices. The SDK methodology and approach also provide the ability for users to develop their own applications on the SDK, and to become a software service (of software-as-a-service, or "SaaS"), which can be monetized via license or subscription. One or more embodiments of the present disclosure provide a distributed computing system for aerospace that enables commercial technologies like artificial intelligence (AI), machine learning (ML), etc., to enable aerospace applications.

One or more embodiments of the present disclosure provide a software development kit (SDK) framework configured to manage different data sources (e.g., fusing data from separate data sources and creating corresponding data packets) to generate objects without impacting other resources. By minimizing the impact and handling data from separate data sources, the system and corresponding methods are "scalable". The scalable framework can be configured to process data from data sources while also permitting plug and play of SDKs without interrupting operations. This enables efficient scaling of the system where data sources may vary and incoming data are dynamic in nature. It not only helps in scalability and reducing the quantity of data but also ensures operational status and the quality of data being pushed to the cloud. For example, SDKs can detach and attach based on system need. In some aspects, the SDK framework of this disclosure, through which avionics application developers can build rapid applications, can operate with or on the onboard avionics subsystem data to generate various inferences in real-time in the cockpit.

The SDK offers various features including data ingestion from the avionics systems through MQ Telemetry Transport (MQTT) and real-time streaming, a rules engine, a time series database, a data pipeline for message exchange, and/or command and control. The platform SDK enables avionics app developers to write time series analytics applications as well as re-use analytics models that are trained in the Aerospace IoT Platform Cloud. The SDK also supports the execution of rules specified for the rules engine running as part of the IoT platform real-time analytics, with certain restrictions. The analytics framework SDK may support the execution of the one or more analytical models against live data stream in the target device platform, such as time series models; and rules and expression configured on cloud server.

According to one or more embodiments, the SDK framework may support functionalities such as: the ability to register and configure the devices that are going to send data into an edge node; the ability to view, create, replace, update and delete rules in the server console; the ability to view the results/notifications from the edge analytics applications on the edge nodes; the ability to support MQTT, CoAP and similar messaging protocol communication with devices in order to ingest data; the ability to run a rules engine that executes rules written for the avionics rules engine running on an IoT platform as part of the real-time streaming analytics capability; the ability to support for basic functionality of an analytics engine as well as the ability to train an avionics model on the cloud and run it on the edge; an advanced capability of the SDK to support the runtime alone; the ability to process data from multiple real-time data streams; the ability to configure size complexity of the complex event processing (CEP) engine; writing analytics application(s) to process real-time data streams; and/or remotely monitoring the health of the solution, administer (e.g., start/stop) the solution and investigate/debug issues.

One or more embodiments of the present disclosure may provide the following benefits and/or advantages: provide for a framework for analytics for aerospace systems and sub systems where provisioned; easily deployable and maintainable analytics framework; provision for "model on the cloud" and "run on the edge" with all cyber considerations for airborne systems; provision for minimizing attack surface by ensuring that edge computing hardware, applications and data are as per the security assurance levels; provision for running aerospace applications on the framework envisioned; bring AI/ML into the cockpit to harness cockpit data and provide real-time insights; improve the situational awareness in flight deck while in a connected state or non-connected state; push data management, data governance and automation of data rich applications at the edge; help original equipment manufacturers (OEMs) and operators relook into their connectivity and data strategies for maximizing benefits and reducing costs; promote use of commercially available off-the-shelf (COTS) and open source for quicker turn around in this market space; and/or provision for scalable deployment solutions which can be orchestrated locally.

Turning to the drawings, FIG. 1 depicts an exemplary diagram of a data flow 100, according to one or more embodiments. In step 101, an operator and/or engineer may use "data integration" engines to develop rules and/or one or more applications ("Engineering") using an integrated flight deck (IFD) 109, which can be a cloud based dashboard. In step 102, a safety officer and/or flight data analysis may use an app engine to develop SDKs ("Advance Tech") that configure the flight efficiency product insights (KPIs) in IFD 109. In steps 112, 113, and 114, the reusable app core 112, reusable user interface framework 113, and reusable data adapter 114, respectively, may pack metadata and send that metadata to edge hardware via integrated flight deck 109 (e.g., using an orchestrator 220 of a networked computing system 200, as discussed more particularly below in FIGS. 2-3 and 5). In step 105, an onboard gateway delivers avionics data 107 to an edge analytics software development kit (SDK) associated with intelligent apps 108. The avionics data 107 is consumed data through the SDK of intelligent apps 108, at step 105. The onboard intelligent applications 108 are configured to consume the avionics data 107 via the onboard avionics IoT gateway (step 105) to deliver one or more inferences to pilot 110 using the IFD 109 (e.g., one or more actions that the pilot can take or the aircraft can perform to result in changing a flight operation, such as flight operation savings. Flight operation savings can be directed towards safety, maintenance, weather related operations, fuel conservation, resource management, etc.). An actionable update (e.g., a sync) may then be made to system 111.

Figure 2:
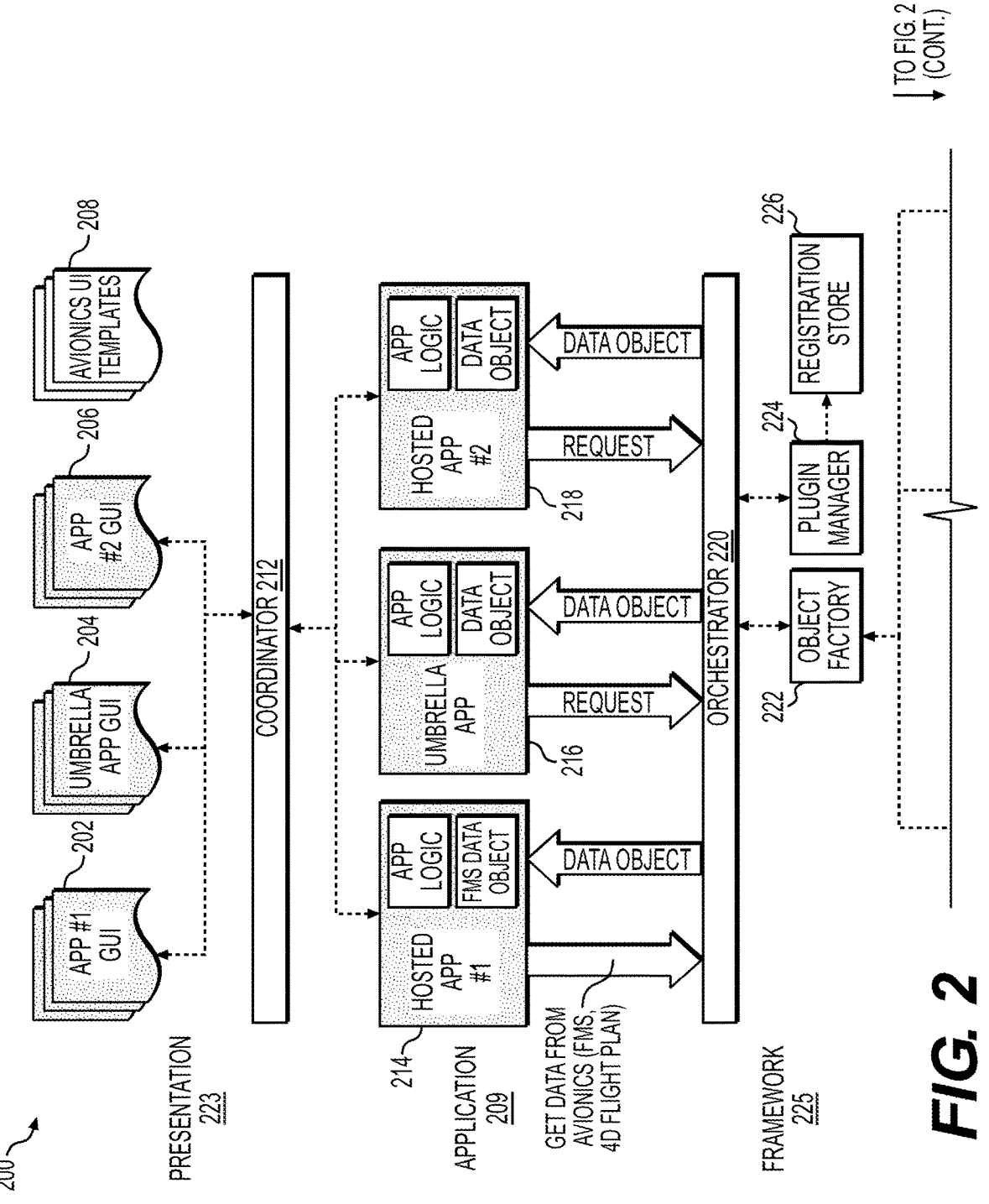
FIG. 2 depicts a schematic block diagram of a framework of a platform of the networked computing system environment of FIG. 1.
Figure 2:
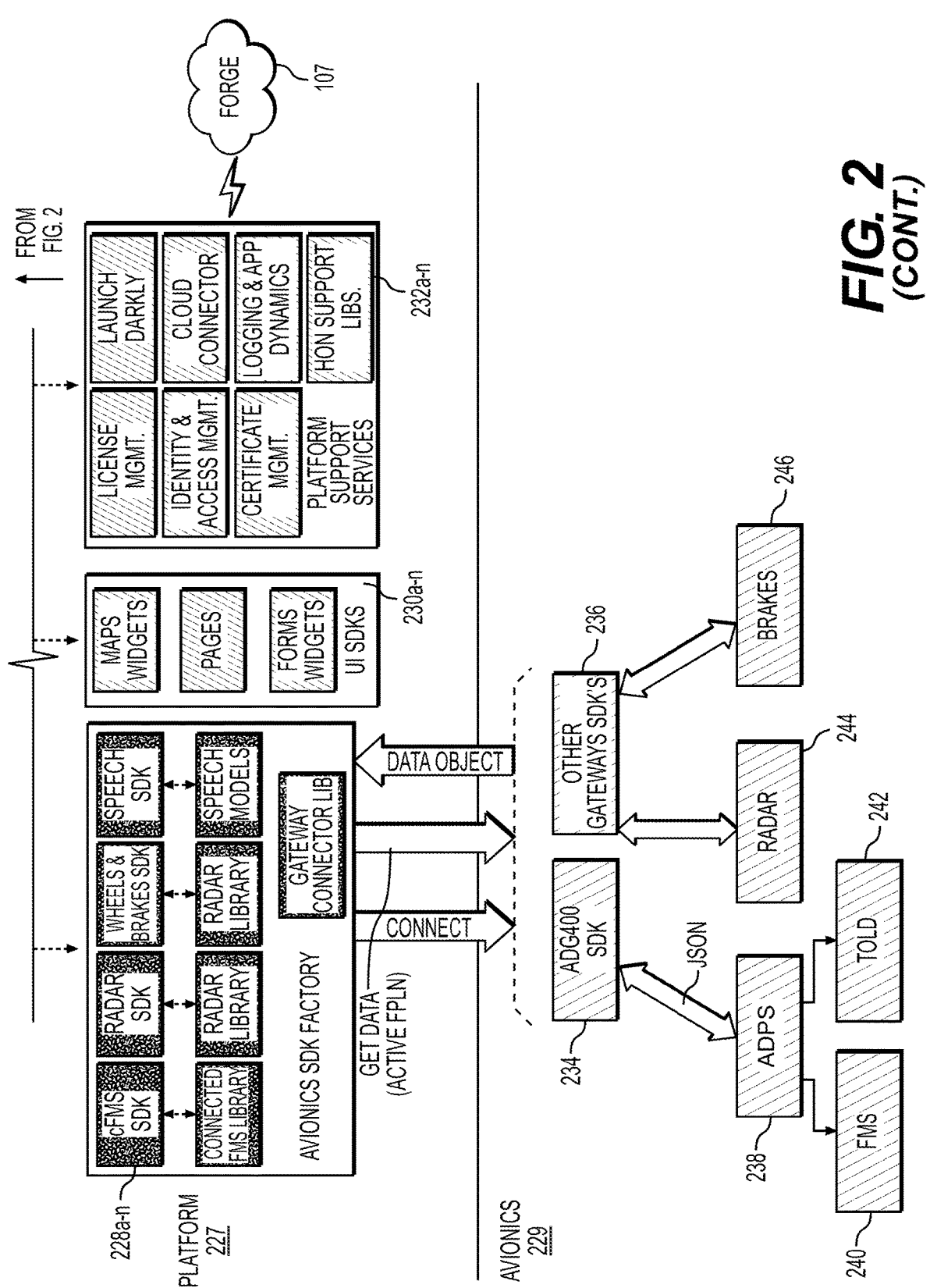
Figure 3:
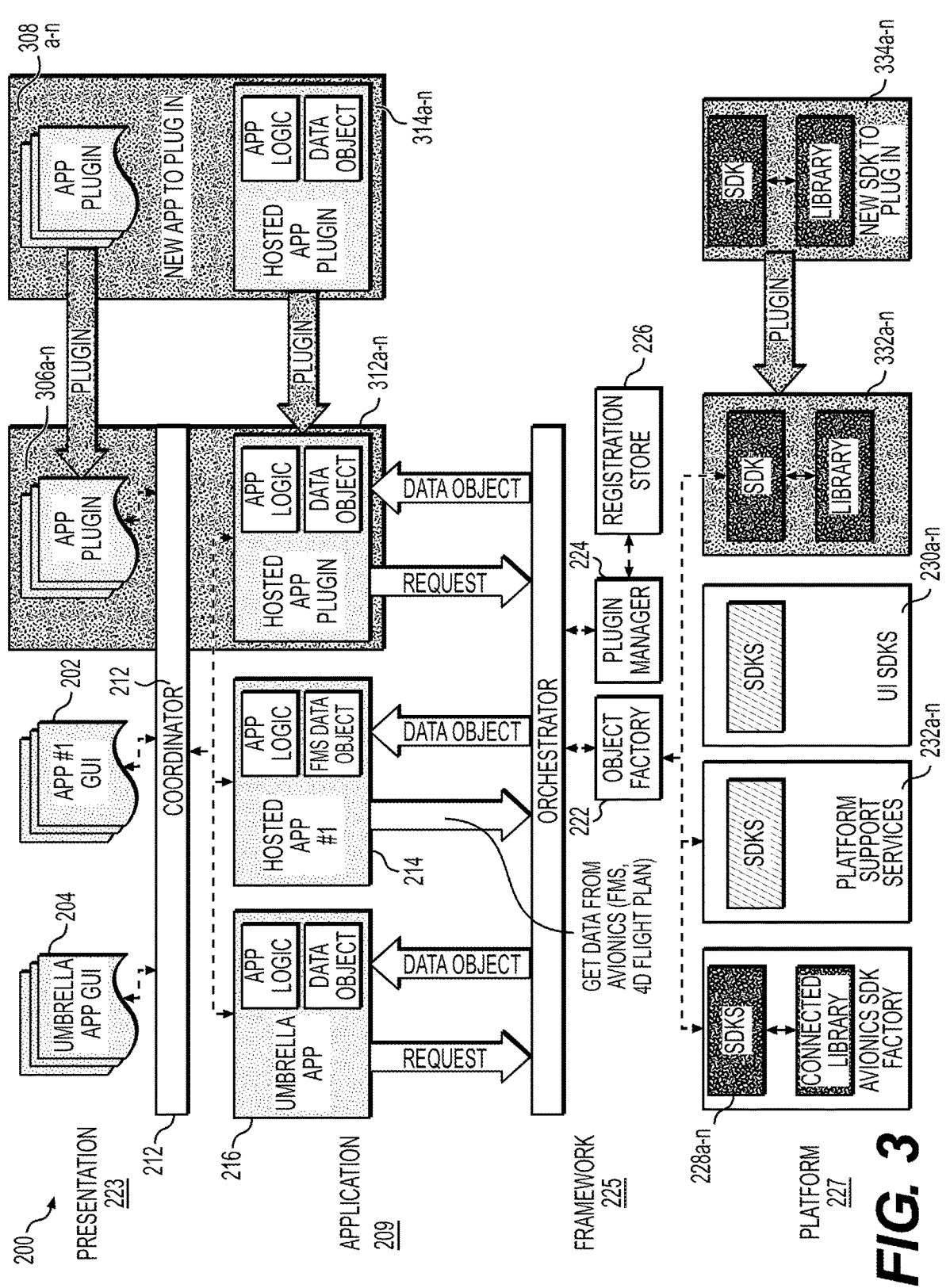
FIG. 3 depicts another example schematic block diagram of the framework of the platform of FIG. 2

FIGS. 2-3 depict an exemplary high-level architecture of herein disclosed networked computing system 200. Specifically, system 200 describes an example IFD platform configured to provide end-to-end real-time data acquisition (e.g., to provide real-time flight insights and maintenance alerting) with seamless access to data from multiple and at times different or varying data sources (e.g., data from avionics data sources) and flexibility to configure events or report fault events. System 200 includes advanced fault detection logic that can be incorporated to identify anomalies without the constraint of computational power and data access. In turn, real-time detection helps end users (e.g., flight crew) to take corrective actions to prevent operational disruptions.

As shown in FIGS. 2-3, the overall architecture of system 200 is illustrated including the SDK components and corresponding framework. System 200 uses real-time accurate models and visual analytics to deliver intelligent actionable recommendations inflight and in real-time to the end user (e.g., a pilot, flight crew, etc.). System 200 is extensible and portable for deployment in any cloud or data center environment for providing an enterprise-wide, top to bottom view, displaying the status of processes, assets, people, and safety. System 200 includes a collection of framework components, SDKs, UI libraries, and rules that specify how applications are developed from the platform and how additional SDKs and UI libraries can be added to the platform. Further, system 200 supports end-to-end capability to execute digital twins against process data and to translate the output into actionable insights as detailed further below.

Computer systems of system 200 may include any type or quantity of one or more processors and one or more data storage devices including memory for storing and executing applications or software modules. In one embodiment, the processors and data storage devices are embodied in server-class hardware, such as enterprise-level servers. For example, the processors and data storage devices may include any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the system 200.

The computer systems of system 200 are configured to receive and transmit data between other components to produce a desired technical result. In one embodiment, system 200 is organized into a plurality of layers of a networked computing environment comprising a coordinator 212 and an orchestrator 220. As detailed further below, components of coordinator 212 are in communication with components of orchestrator 220 via a network. The network may be any suitable network or combination of networks and may support any appropriate protocol suitable for communication of data to and from components of coordinator 212 and orchestrator 220 via the cloud and between various other components in the networked computing system environment 200. The network may include a public network (e.g., the Internet), a private network (e.g., a network within an organization), or a combination of public and/or private networks. The network may be configured to provide communication between various components depicted in FIGS. 1-3.

The network may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cellular networks, satellite, licensed radio, or a combination of cellular, satellite, licensed radio, and/or unlicensed radio networks.

System 200 may support multiple layers, such as, for example, a presentation layer 223, an application layer 209, a framework layer 225, a platform layer 227, and an avionics layer 229, as shown. In AIoT systems, AIoT providers may direct their focus toward connecting onboard avionics devices, extracting data from those devices, and sending the data to the cloud for analytics with the help of one or more onboard IoT gateways (e.g., gateway connector library of the avionics SDK factory 228a-n, other gateway SDKs 236 of the avionics layer 229, etc.). In one embodiment, the presentation layer 223 of system 200 includes a plurality of graphical user interfaces (GUI) of applications 202, 204 (e.g., an umbrella application GUI), 206, as well as avionics GUI templates 208. The presentation layer 223 and application layer 209 can include the application associated with system 200 and features hosted therein, including the GUI for a user to interact with the application as well as the business logic of the application. Additional UI features can be added at any time as detailed in the reference architecture The application layer 209 can include one or more hosted applications 214, 216, 218 with corresponding logic and concrete data objects. In some aspects, applications 214, 216, 218 may perform business logic on data streams. Communication between components of the presentation layer 223 (e.g., application GUIs 202, 204, 206) and components of application layer 209 (e.g., applications 214, 216, 218) may be performed using coordinator 212 via the network, which may include use data and security communications.

A connected avionics system, such as systems 100 and 200 in FIGS. 1-3, may have the data stream injected into gateways from multiple onboard avionics subsystems, such as flight management system (e.g., FMS 240), enhanced ground proximity warning systems (EGPWS), weather radar 244, brakes 246, etc. for data transfer to cloud-based analytics. In this respect, orchestrator 220 may be configured to push and pull information from applications 214, 216, 218, for example, upon receipt of instructions from users of application GUIs 202, 204, 206, 208. In some aspects, hosted application 214 can push data objects from orchestrator 220 and/or pull data from data sources in communication with orchestrator 220 (e.g., avionics data such as FMS, 4D flight plan, etc.). Orchestrator 220 in turn can be in communication with an object factory 222 of the framework layer 225, which creates the interface for data objects.

The framework layer 225 can be communicatively coupled between the SDKs of platform layer 227 and the applications of the application layer 209 and function as a standard interface that all SDKs can expose. In some aspects, the framework layer 225 creates concrete instances of the SDKs, managing the number of objects created. The object factory 222 can be communicatively coupled to components of the platform layer 227. For example, object factory 222 can be configured to handle objects from the avionics SDK factory 228*a-n*, UI SDKs 230*a-n*, and platform support services 232*a-n*. Avionics SDK factory 228*a-n* can include SDKs related to cFMS, RADAR, wheels and brakes, speech, connected FMS, RADAR, gateway connectors, and the like. UI SDKS 230*a-n* can include maps widgets, pages widgets, forms widgets, and/or the like. Platform support services 232*a-n* can include components related to license management, identity and access management, certificate management, launch darkly, cloud connectors, logging and application dynamics, support libraries and the like. In some aspects, platform support services 232*a-n* can be communicably connected to gateway devices, such as connected gateway devices.

Platform layer 227 can contain all of shared SDKs of the system 200, whereby the shared SDKs contain all the connectivity to external devices and any other content that can be shared across applications. Components of avionics SDK factory 228*a-n* can include hosted SDKs for avionics and/or flight management such as Flight Management Systems, Enhanced Ground Proximity Warning System (EGPWS), Traffic Collision Avoidance System TCAS, Weather or RADAR Systems, electronic flight bag (EFB) devices, wheels, connected FMS library, speech models, gateway connector libraries, etc. It is understood that these hosted SDKs can be software entities which can be included to generically manage interfaces and connections, provide access to engines, and host other shareable features. Avionics SDK factory 228*a-n* can be communicatively coupled to the avionics layer 229, including components thereof. For example, avionics SDK factory 228*a-n* can be configured to connect with the avionics layer 229 and receive components therefrom. In some aspects, content to be shared that does not exist within a predetermined SDK can be encapsulated within a SDK wrapper. Such SDKs can come prepacked within platform layer 227 and provide core capabilities that can be required by an application (e.g., data logging, connection to both avionics and the cloud, data management, security management, etc.).

Components of the avionics layer 229 can include SDKs of aircraft servers (e.g., ADG400 SDK 234) as well as other gateway SDKs 236. SDKs of aircraft servers can in turn be communicatively coupled (e.g., SDKs of aircraft servers can filter and convert complex avionics data into various streaming formats such as JavaScript Object Notation (JSON), Extensible Markup Language (XML), etc.) and transmit the converted avionics data to various client applications with avionics data processing service (ADPS) gateway 238. ADPS gateway 238 can serve as a point of entry between system 200 as well as a point of entry for a group of micro-services, such as the connected FMS micro-services 240, takeoff-and-landing data systems (TOLD) 242, and/or the like. ADPS gateway 238 may be, for example, configured to be updated each time a new micro-service is added or removed in the connected FMS micro-services 240. ADPS gateway 238 may be implemented as hardware, software, and/or a combination of hardware and software.

A key attribute of the IFD of system 200 is the ability to add additional content as plugins to the existing application, providing extensibility, flexibility, and isolation of application features and customs processing logic. Therefore, in addition to object factory 222, a plugin manager 224 can be communicatively coupled to orchestrator 220, whereby plugin manager 224 can be in communication with registration store 226. In particular, system 200 includes components of the platform layer 227 and orchestrator 220, including object factory 222, plugin SDK 332*a-n* and new SDKs 334*a-n* to plug-in, as shown in FIG. 3. In so doing, platform layer 227 (e.g., orchestrator 220) in concert with coordinator 212 enables system 200 to provide an umbrella application that can be found in an app store and once installed enables the purchase and use of additional hosted apps as they become available. For example, newer applications can be readily added at the application layer 209 and/or presentation layer 223.

In some aspects, one or more newer applications 308*a-n* can be added via application plugin 306*a-n*, which can be communicatively coupled to coordinator 212. One or more newer hosted applications 314*a-n* can be added via hosted application plugin 312*a-n*, which can be communicatively coupled to orchestrator 220 and coordinator (e.g., similar to applications 214, 216, 218). As shown between FIGS. 2 and 3, hosted applications (e.g., applications 216, 214) and hosted SDKs of SDK factory 228*a-n* are understood as being plugin components. System 200 in turn provides extension points that such plugin components can hook into, whereby each plugin component can registers itself to system 200, passing information such as name, communication protocol, input/output data handlers, data format, and hooks into these extension points.

The specific rules and processing of adding plugin SDK 332*a-n* and new SDK to plugin 334*a-n* to the platform layer 227 via object factory 222 and orchestrator 220 are separate from the other components of the platform layer 227. In some aspects, at any given point, SDKs 332*a-n*, 334*a-n* can be added, removed, and/or otherwise modified with little or no effect on the other parts of the system or other plugged-in content. In turn, adding plugin SDK 332*a-n* and new SDK to plugin 334*a-n* to the platform layer 227 via object factory 222 and orchestrator 220 creates an application framework that is configured to externalize the multitude and complex avionics sub system real time data without needing to understand the low-level intricacies.

One or more rules engines of the system may be highly customizable frameworks for complex event processing. The term "engine" as used in this disclosure is understood as a self-contained piece of business functionality with interfaces contained within a hosted SDK (e.g., a microservice). Some non-limiting examples of engines contemplated for use with system 200 and related methods of this disclosure can include a Flight Management Engine (FME), Takeoff and Landing Engine (TOLDE), a Navigation Database Engine, as well as higher order content as a flight plan comparator utility. This enables efficient data filtering where patterns of incoming data are dynamic in nature. It not only helps in reducing the quantity of data but also ensures the quality of data being pushed to the cloud.

The herein discussed rules engine(s) may be used as a framework for building event-based workflows. The rules engine may include one or more of three main components: a message component, e.g., any incoming event; a rules node; and/or a rules chain. The message may refer to incoming data from devices, device life-cycle event, REST API event, RPC request, etc. The rules node may be a function that would be executed on an incoming message. There are many different node types that can filter, transform, and/or execute some action on incoming message. The rules chain may be nodes relate to each other with relations, so the outbound message from rule node is sent to next connected rule nodes.

Below are some common use cases for configuring rule chains: data validation and modification for incoming telemetry or attributes before saving to the database; copy telemetry or attributes from devices to related assets so you can aggregate telemetry, e.g., data from multiple avionics subsystems can be aggregated in related asset; create/update/ clear alarms based on defined conditions; trigger actions based on edge life-cycle events, e.g., create alerts if device is online/offline; load additional data required for processing, e.g., load temperature threshold value for a device that is defined in device's customer or tenant attribute; trigger REST API calls to external systems; raise alarms/alerts when complex event occurs and use attributes of other entities inside email template; and/or consider user preferences during event processing. In some aspects, messages transmitted from system 200, such as triggers and/or alerts, can be configured for transmitting information to flight crew and ground controllers for maintenance preparations reducing the aircraft-on-ground (AOG) times. System 200 can also be configured to detect near misses can also be configured in the IFD to build a trend model for early detection of anomalies before faults or malfunctions occur increasing safety.

Figure 4:
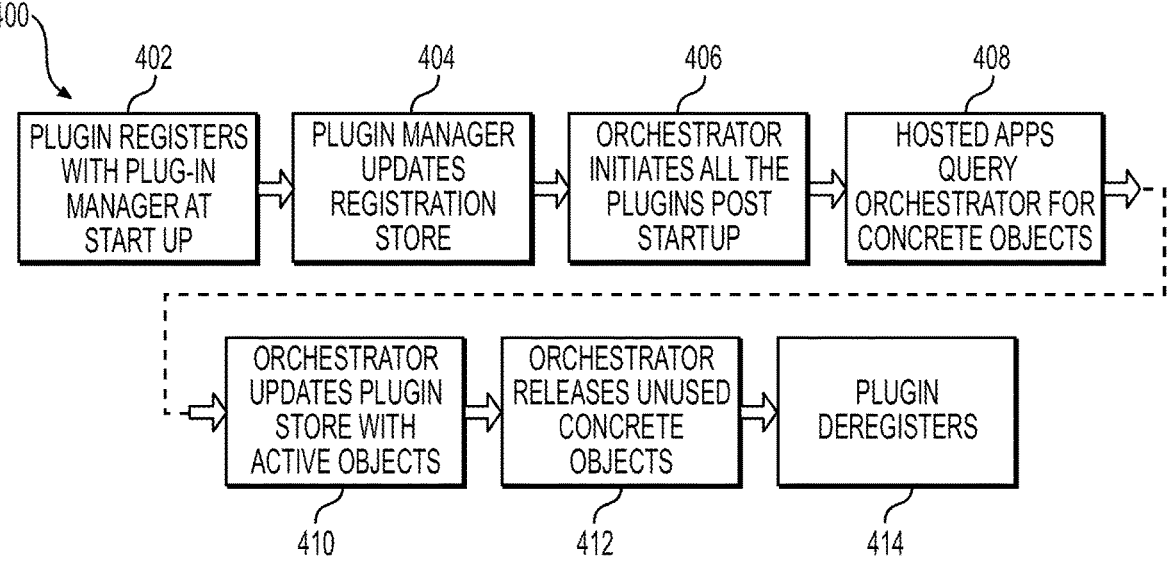
FIG. 4 depicts an exemplary diagram of a method of adding a hosted application or SDK, according to one or more embodiments.

FIG. 4 depicts a flowchart for a method 400 of adding a hosted application or SDK to system 200. In step 402, the method may include registering the plugin with plugin manager 224 at startup. In step 404, the method may include plugin manager 224 updating the registration store. In step 406, the method may include orchestrator 220 initiating all of the plugins post-startup. In step 408, the method may include the hosted apps query orchestrator 220 for concrete objects. In step 410, the method may include orchestrator 220 updating the plugin store with active objects. In step 412, the method may include orchestrator 220 releasing unused concrete objects. In step 414, the method may include the plugin deregistering.

Figure 5:
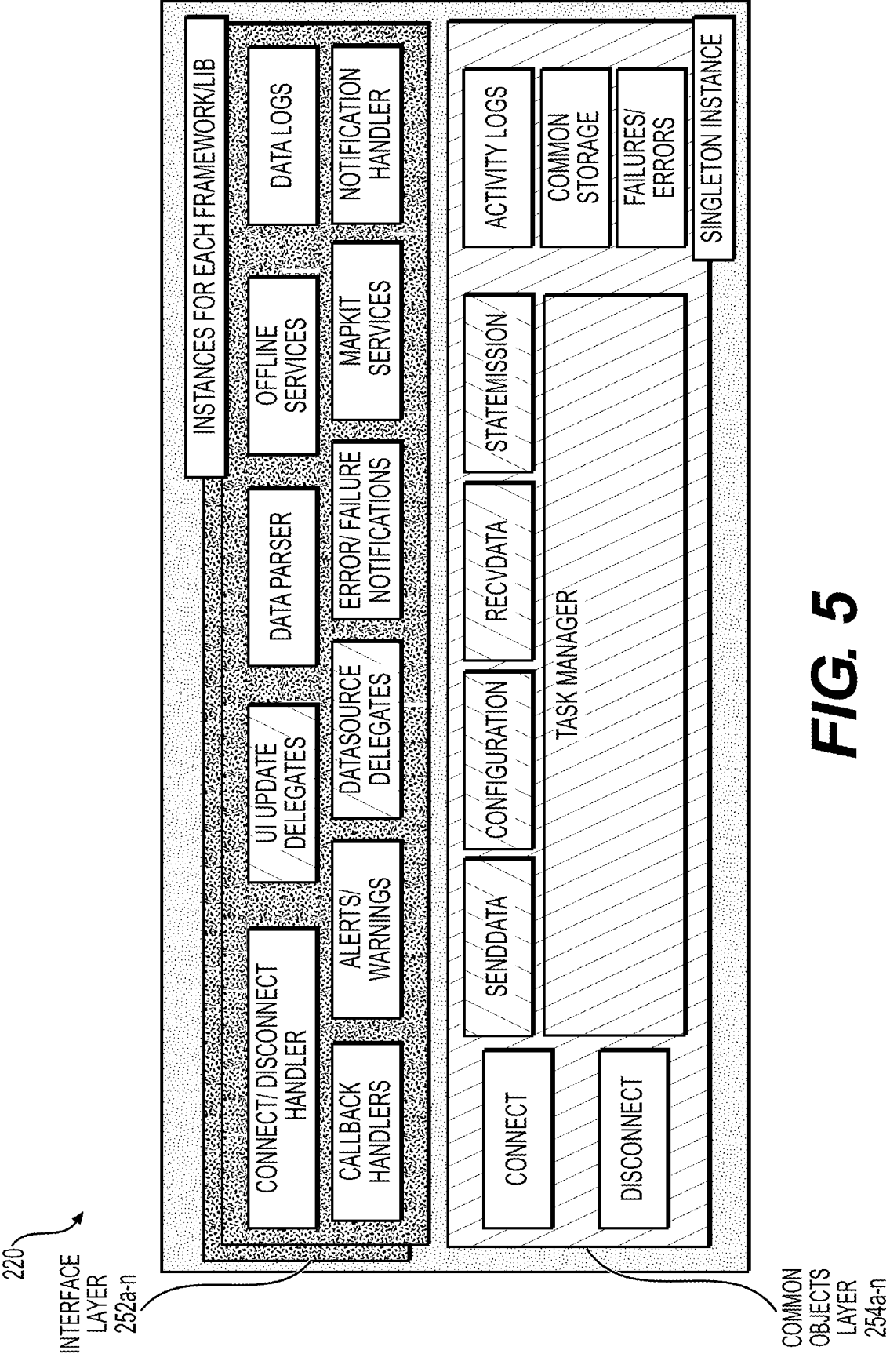
FIG. 5 depicts an exemplary layered view of an example orchestrator according to one or more embodiments.

FIG. 5 depicts an exemplary layered view of orchestrator 220, according to one or more embodiments. As illustrated, orchestrator 220 can provide a framework which provides the SDK and piece parts to build new applications into system 200 without starting from scratch. Orchestrator 220 can include an interface layer 252*a-n* and a common objects layer 254*a-n*. Interface layer 252*a-n* may be configurable for each framework and/or library and include a connect/disconnect handler, a UI updated delegates, a data parser, offline services, data logs, callback handlers, alerts/warnings, data source delegates, error/failure notifications, mapkit services, notification handler, etc. Common objects layer 254*a-n* can be configurable for singleton instances and include modules to connect/disconnect, a senddata, a configuration, receive data, mission status, task manager, activity logs, common storage, failures/errors, etc. By way of example and without limitation, if a connected auxiliary power unit (APU) is to provide an EFB application, there are typically high development costs involved with developers having to understand the intricacies of the overall avionics system. Having a centralized system, as in the IFD computing system 200 with orchestrator 220, is configured to allow for reduced development cost and also hosting features.

Figure 6:
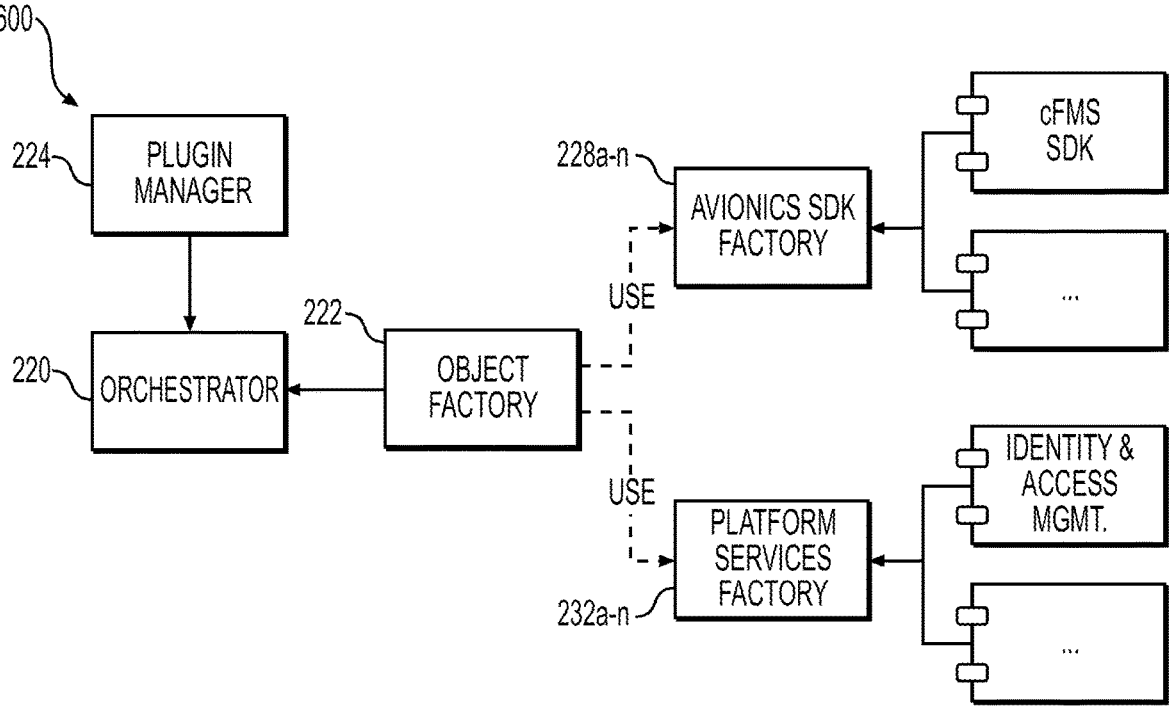
FIG. 6 depicts an exemplary schematic view of exemplary plugin architecture, according to one or more embodiments.

According to one or more embodiments, exemplary plugin architecture 600 is illustrated in FIG. 6. The plugin architecture 600 of FIG. 6 may include plugin manager 224 and orchestrator 220, which can be communicatively coupled to object factory 222. Object factory 222 is shown configured to handle objects from avionics SDK factory 228*a-n* and platform support services 232*a-n*, and all corresponding components thereof. For example, avionics SDK factory 228*a-n* can include and platform support services 232*a-n* can include any of their respective herein described components.

FIG. 7 depicts a flowchart for a method 700 of using orchestrator 220. In step 702, the method may include registering, by one or more plugins, with an orchestrator. In step 704, the method may include using, by a plugin manager, a registration store to maintain an archive of plugin metadata. In step 706, the method may include maintaining, by the orchestrator, a reference of one or more concrete classes of the plugin metadata. In step 708, the method may include instantiating, by the orchestrator, the one or more plugins at startup. In step 710, the method may include requesting, by a client, the orchestrator for one or more concrete objects. In step 712, the method may include returning, by the client, the one or more concrete objects after use. In step 714, the method may include destroying, by the orchestrator, the one or more concrete objects at shutdown.

Figure 8:
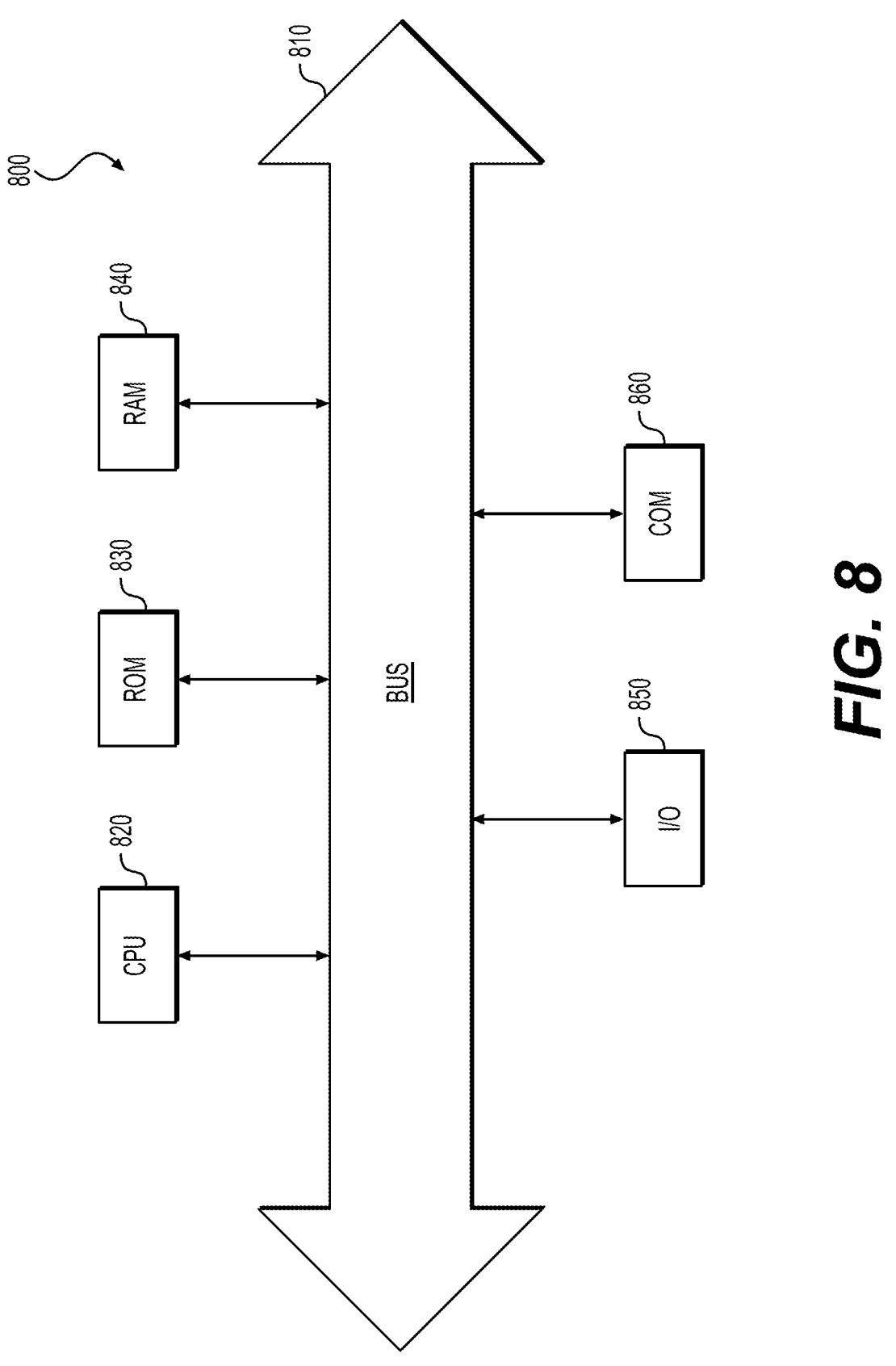
FIG. 8 depicts an example system that may execute techniques presented herein.

FIG. 8 depicts an example system 800 that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform also may include a central processing unit ("CPU") 820, in the form of one or more processors, for executing program instructions. The platform may include an internal communication bus 810, and the platform also may include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what the best maintenance option may be and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

One or more embodiments of the present disclosure address the above problems and are able to provide scalable, reliable real-time decision support systems by developing a method for providing inflight analytics. The present disclosure describes at least one method of a customizable rules engine which may be processed during the flight for applications related to flight safety, efficiency and maintenance.

The herein disclosed computing methods may include, but are not limited to, statistical analysis, autonomous or machine learning, and AI. AI may include, but is not limited to, deep learning, neural networks, classifications, clustering, and regression algorithms. By using such computational methods, flight insights and related predictions as to safety and flight operation management may be achieved by helping users (e.g., flight crew) improve their inflight operation insight accuracy, reliability, efficiency, and accessibility. For example, such computational methods may be used to assist with detecting or otherwise predicting flight operation events or trends, thereby allowing end users to check and confirm with respect to current flight operations in real-time before rendering a corrective action. In particular, embodiments disclosed herein may use weak supervision, in which a deep learning model may be trained directly from avionics data sources as well as flight operation data. A machine learning or deep learning model may include a machine learning algorithm, in some embodiments. This enables systems to be trained directly from diagnostic reports or test results without the need for extensive annotations. This is particularly advantageous since the herein disclosed system provides for real-time scenario modelling, insight presentation, and live feedback on regarding statistical insights. With the integrated flight deck (IFD), the data acquisition as well as analytics also can be real-time and will not have to rely on third party data that can only be retrieved post flight and has limited data for analysis.

The herein disclosed systems and methods are advantageous to provide all content within a single application to enable synergies across multiple applications and thus make them more usable (e.g., as an integrated flight deck application platform that unifies cockpit interface management). In so doing, the IFD is configured to bridges previously known problems by providing an end-to-end real-time data acquisition as well as a presentation platform for inflight operation insights (e.g., fuel efficiency insights). With the herein disclosed IFD, KPIs can be generated inflight and in real-time rather than post-flight.

For example, real-time flight data from the IFD can be used to quickly assess the flight parameter (e.g., a flight situation) and provide instant feedback to users (e.g., flight crew) as to flight efficiency related operations. In some aspects, the IFD can be configured with a flight level advisory system that provides potential cost-efficient flight levels based on historical flights. The IFD, having real-time access to data pertaining to flight mission(s) and state(s), evaluates insights against the current conditions and presents the most appropriate insights to the GUI of the IFD on its interface to corresponding users (e.g., flight crew). The herein disclosed systems and methods are advantageous to transform traditional expensive avionics functions deployment lifecycles with faster and inexpensive paths provided by a certified cFMS environment.

The herein disclosed systems and methods are advantageous for subscription-based solutions to be quickly integrated into applications developed using this technology. For example, the herein disclosed systems and methods provide a framework that enables a common look and feel, common behavior, and simplified user experience across a suite of hosted applications. This user interface content of the herein disclosed systems and methods can be configurable to be changed from one user to another without impacting the application logic.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

In this disclosure, relative terms, such as, for example, "about," "substantially," "generally," and "approximately" are used to indicate a possible variation of ±10% in a stated value.

The term "exemplary" is used in the sense of "example" rather than "ideal." "One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of using an electronic flight bag (EFB) application framework with an aircraft, comprising:

providing, by an integrated flight deck (IFD) networked computing system, data acquisition for generating a plurality of inflight operation insights, the IFD networked computing system comprising: a presentation platform, a plurality of framework components, a software development kit (SDK) framework, and one or more user interface libraries configured to develop a plurality of applications from the presentation platform and add one or more additional SDKs and/or libraries to the presentation platform, wherein the presentation platform comprises one or more graphical user interfaces (GUI) associated with the IFD networked computing system, wherein the plurality of framework components comprises an object factory to manage data from a plurality of data sources, and wherein the SDK framework is configured at least to process the data in real-time;

aggregating, by an orchestrator of the SDK framework, the plurality of data sources to fuse the data from the plurality of data sources and create a data packet comprising real-time flight data, wherein the orchestrator is a component of the networked computing environment to communicate the data via cloud, wherein the orchestrator comprises at least an interface layer to configure each framework component of the plurality of framework components, and wherein the orchestrator supports to modify the SDKs without effecting the SDK framework, wherein the SDK framework executes a customizable avionics rules engine on an IoT platform for real-time streaming analytics and complex event processing, and the rule engine being operable to process real-time telemetry streams using rule chains composed of message components and rules nodes;

generating, the plurality of inflight operation insights by analyzing a plurality of key performance indicators of the created data packet, wherein the key performance indicators are generated in real-time inflight based on the real-time data using IFD networked computing system;

assessing a flight parameter based on the generated inflight operation insights, wherein the inflight operation insights comprise information related to flight operation management; and presenting an electronic display regarding the flight parameter to one or more users, the electronic display comprising an electronic display of one or more actions available for changing a flight operation.

2. The method of claim 1, further comprising:
evaluating, by the IFD networked computing system, the plurality of inflight operation insights against current atmospheric conditions and real-time flight mission information to generate a plurality of flight mission insights, the inflight operation insights comprising fuel efficiency insights and/or flight efficiency insights.

3. The method of claim 1, further comprising:
wherein the orchestrator is a common object layer comprising one or more modules to manage data, wherein the step of aggregating further comprises:
receiving, by the common object layer, objects from low-level platform components, wherein the objects include the data from the plurality of data sources; and
using the received objects to receive data from the plurality of data sources, including get and send files, get, and send objects, sign up for periodic data, and/or sign up for event data.

4. The method of claim 3, wherein the orchestrator is a single point of source where a client and/or a feature module can access components and services of the common object layer.

5. The method of claim 3, further comprising:
holding, by the object factory in communication with the orchestrator, objects from the low-level platform components in an object pool, wherein the object factory is communicatively coupled to components of the platform layer and is configured to handle the objects from the SDK framework; and
using, by the object factory, a plugin manager to register and/or deregister the low level platform components.

6. The method of claim 1, further comprising:
registering each of the plurality of data sources with the orchestrator and then exposing a common API to the orchestrator.

7. The method of claim 1, wherein the plurality of framework components comprise an object factory, and a plugin manager in communication with the object factory.

8. The method of claim 1, further comprising:
generating, by a flight level advisory system of the IFD networked computing system, one or more cost-efficient flight levels based on historical flight data, wherein the cost-efficient flight levels are decided based on cost involved in managing one or more operations of the aircraft.

9. The method of claim 1, further comprising:
generating, by the IFD networked computing system, one or more real-time maintenance alerts by analyzing real-time avionics data and detecting one or more fault conditions or event conditions.

10. The method of claim 1, further comprising:
analyzing, by the IFD networked computing system, avionics data to detect one or more anomalies related to a flight operation; and
upon detecting the one or more anomalies, then generating, by the IFD networked computing system, one or more alerts to be presented on a user interface.

11. The method of claim 1, further comprising:
analyzing, by the IFD networked computing system, avionics data to detect one or more anomalies related to a flight operation; and
upon detecting the one or more anomalies, then instructing to take one or more corrective actions to prevent one or more operational disruptions.

12. The method of claim 1, further comprising:
determining a prediction, using a machine learning prediction model, for one or more fault conditions, event conditions, and/or anomalies of inflight operations, the machine learning prediction model having been generated by processing avionics data and the real-time flight data; and
causing the aircraft, based on the prediction, to take one or more corrective actions to prevent one or more operational disruptions.

13. An electronic flight bag (EFB) application framework system of an aircraft, comprising:
at least one memory storing instructions; and
at least one processor executing the instructions to perform a process comprising:
using real-time flight data to generate end-to-end real-time data analytics for inflight features around inflight operation insights and mission management, the real-time flight data comprising a plurality of onboard avionics subsystems;
using real-time flight data to generate an avionics common object model of the aircraft, wherein the avionics common object model corresponds to a model trained at least on the real-time flight data using a software development kit (SDK) framework, wherein the SDK framework executes a customizable avionics rules engine on an IoT platform for real-time streaming analytics and complex event processing, and the rule engine being operable to process real-time telemetry streams using rule chains composed of message components and rules nodes;
fusing the avionics common object model with data corresponding to aerospace safety services, fuel efficiency service, ground service, pilot workflow automation and connected maintenance service for that aircraft;
integrating one or more avionics subsystems into the avionics common object model by using extensions and defining a domain model based upon the avionics common object model and making the domain model available for one or more applications via onboard application programming interfaces (APIs), wherein the extensions allow one or more plugin components to register into the system of the aircraft, and wherein the domain model comprises at least the real-time flight data to deliver intelligent actionable recommendations inflight;
using the avionics common object model to provide flow of communication between the one or more avionics subsystems and applications hosted on one or more external EFB devices, and wherein the avionics common object model supports to modify a plugin component of the one or more plugin components without effecting the one or more plugin components; and
transmitting one or more alert messages from one or more applications hosted on one or more external EFB devices to a user based on the inflight operation insights and/or a flight status.

14. The system of claim 13, wherein the instructions comprise:
providing communication connectivity, via an avionics data processing service (ADPS), between the aircraft, the one or more external EFB devices and/or a cloud based computing system, a processor of the aircraft being configured to control one or more on-board avionics control functions using the ADPS to render accessible a connected cockpit computing system, wherein the ADPS is a gateway to serve as a point of entry between the system and a group of flight services.

15. The system of claim 13, wherein the applications hosted on the one or more external EFB devices are directed to fuel efficiency, flight safety, aircraft maintenance, and/or pilot workflow automation.

16. The system of claim 13, wherein the one or more alert messages comprise weather hazard avoidance, flight efficiency and/or safety.

17. The system of claim 13, wherein the one or more alert messages are configured to transmit information regarding the aircraft maintenance preparation to a ground controller user.

18. The system of claim 13, wherein the instructions comprise:

determining a prediction, using a machine learning prediction model of the EFB application framework system, for one or more fault conditions, event conditions, and/or anomalies of flight operations, the machine learning prediction model having been generated by processing the real-time flight data avionics data.

19. The system of claim 18, wherein the instructions comprise:

causing the aircraft, based on the prediction, to take one or more corrective actions to prevent one or more operational disruptions.

20. A non-transitory computer-readable medium storing instructions that, when executed by a processor, cause the processor to perform a method, the method comprising:

using real-time flight data to generate end-to-end real-time data analytics for inflight features around inflight operation insights and mission management, the real-time flight data comprising a plurality of onboard avionics subsystems;

using real-time flight data to generate an avionics common object model of an aircraft, wherein the avionics common object model corresponds to a model trained at least on the real-time flight data using a software development kit (SDK) framework, wherein the SDK framework executes a customizable avionics rules engine on an IoT platform for real-time streaming analytics and complex event processing, and the rule engine being operable to process real-time telemetry streams using rule chains composed of message components and rules nodes;

fusing the avionics common object model with data corresponding to aerospace safety services, fuel efficiency service, ground service, pilot workflow automation and connected maintenance service for the aircraft;

integrating one or more avionics subsystems into the avionics common object model by using extensions and defining a domain model based upon the common data object and making the domain model available for one or more applications via onboard application programming interfaces (APIs), wherein the extensions allow one or more plugin components to register into the system of the aircraft, and wherein the domain model comprises at least the real-time flight data to deliver intelligent actionable recommendations inflight;

using the avionics common object model to provide flow of communication between the one or more avionics subsystems and applications hosted on one or more external EFB devices, and wherein the avionics common object model supports to modify a plugin component of the one or more plugin components without effecting the one or more plugin components; and transmitting one or more alert messages from one or more applications hosted on one or more external EFB devices to a user based on the inflight operation insights and/or a flight status.

* * * * *